2,793,981
Patented May 28, 1957

2,793,981

PRODUCTION OF GLYCEROL AND D-ARABITOL

John F. T. Spencer, Sutherland, Saskatchewan, and James M. Roxburgh and Henry R. Sallans, Saskatoon, Saskatchewan, Canada, assignors to The National Research Council, Ottawa, Ontario, Canada, a body corporate of Canada No Drawing. Application May 16, 1955,
Serial No. 508,792

18 Claims. (Cl. 195—38)

This invention relates to the production of polyhydric alcohols. More particularly it relates to the simultaneous formation of glycerol and D-arabitol by fermentation of a sugar.

It has not been found commercially suitable to produce D-arabitol by the methods hitherto employed. These methods involved the chemical reduction of D-arabinose to form D-arabitol. However, such chemical methods are slow and expensive.

Although glycerol can now be produced by fermentation, the methods suggested required addition of large quantities of sulfites or bisulfites to a yeast fermentation, or control of the pH of the fermentation by the addition of large quantities of alkalis.

It is therefore an object of the present invention to produce D-arabitol more economically.

It is a further object of this invention to produce glycerol as an important by-product in the preparation of the D-arabitol.

These and other objects are obtained in the preparation of a polyhydric alcohol selected from the group comprising D-arabitol glycerol and erythritol by the fermentation of a sugar with an osmophilic yeast selected from the group consisting of *Saccharomyces rouxii* and *Saccharomyces mellis*.

There is some confusion among different authorities as to the nomenclature of the osmophilic yeasts. The system of nomenclature contained in Lodder and Kreger van Rij's book, "The Yeasts" is used in the present invention. According to these authors, and in accordance with the present invention, all the osmophilic yeasts are classed either as *Saccharomyces rouxii* or *Saccharomyces mellis*, and include all yeasts which grow on jams, jellies, honey, pollen, dried fruits or any other materials high in sugar content. These authors do not recognize a genus or subgenus Zygosaccharomyces. Therefore in accordance with the present invention, *Z. barkeri* and one strain of *Z. nussbaumeri* are placed in the species *S. rouxii*, and *Z. mellis*, *Z. richteri*, and another strain of *Z. nussbaumeri* in the species *S. mellis*.

The fermentation will normally be conducted with aeration and in the presence of a nitrogenous agent. The nitrogenous agent will generally be corn steep liquor and/or yeast extract, and either or both of these may be used in conjunction with a further nitrogenous agent such as urea, ammonium sulfate or ammonium tartrate.

In one embodiment of this invention, a medium consisting of 20% glucose, 0.8–1.0 percent corn steep liquor or yeast extract, and 0.35 percent urea is used. The fermentation is carried out using strains of *Saccharomyces mellis*, strain P3a NRRL Y–2392, or *S. rouxii*, strain H3C NRRL–Y2391. The manner of selection of optimum strains of *S. mellis* and *S. rouxii* will be given later. In agitated, fully baffled fermentors aeration of the medium to give a ratio of solution of oxygen of 40–60 millimoles oxygen per liter of medium per hour, as measured by iodometric titration of aqueous sodium sulfite with copper sulfate catalyst, gives the optimum rate of fermentation and optimum yield of the glycerol by-product. The yield of D-arabitol is affected very little by aeration.

It is found that a selection of a good strain of yeast is important, as strains vary widely both in total yield of product and in ratios of glycerol to D-arabitol to erythritol.

Suitable yeasts according to the present invention can be readily isolated from brood comb pollen, fermenting honey, "sugared" dried fruits, if these have not been sterilized in any way, and fermenting jams, jellies, syrups or other materials having a high sugar content and showing signs of fermentation. An especially suitable isolation medium is 60% honey, 0.25% yeast extract and 39.75% water. Samples of the source material are placed in sterile culture tubes of the above medium, and when growth is observed the cultures are plated out and pure cultures isolated by standard bacteriological methods. The cultures are maintained on slants of the same medium as was used for isolation, solidified with agar.

The cultures are tested for production of D-arabitol, glycerol and erythritol by inoculating them into 500 ml. Erlenmeyer flasks containing 50 ml. of an aqueous medium containing:

| | Percent |
|---|---|
| Glucose | 20 |
| Yeast extract | 1 |
| Urea | 0.15 |

These flasks are placed on a rotary shaker and grown at 30° C. until the glucose is all utilized. The broth is analyzed for D-arabitol, erythritol and glycerol and a strain producing good yields in a reasonable length of time is selected.

The yeast used in the following examples was isolated in the above manner starting from brood comb pollen. Any other yeast selected in the above manner would be suitable for use in the present invention.

It is found that the more rapidly growing cultures of osmophilic yeasts usually produce relatively large quantities of glycerol and D-arabitol, or, occasionally, D-arabitol alone and this is a reasonably good criterion for selection of the optimum species. Those cultures growing more slowly usually produce glycerol and tetritol presumed to be erythritol, or erythritol alone. An increase in the concentration of the nitrogen in the medium may increase the growth rate and yield.

In general, the fermentation according to the present invention takes place in sugar concentrations of the order of 20–40%, with fermentation times of 4–10 days. These fairly concentrated sugar solutions result in more highly concentrated solution of the reaction products, which tends to increase the efficiency of recovery and so reduce costs. Using 20% sugar solution in shake flasks, concentrations of 8% arabitol and 8% glycerol have been obtained.

The recovery of both the arabitol and the glycerol is relatively easy. After concentration and removal of gum, the arabitol crystallizes directly from the filtrate. This leaves the glycerol in a solution from which it may be recovered readily by conventional methods.

The following examples are given to illustrate various aspects of the process of the present invention.

EXAMPLE 1.—PREPARATION OF INOCULUM FOR THE STIRRED FERMENTORS

The inoculum for the 5 liter fermentors is grown in 250 ml. Erlenmeyer flasks containing 150 ml. of medium. These flasks are inoculated either directly from the agar slant, referred to above in the isolation of suitable species, from a tube of liquid culture of the organism, or from a previous shake flask culture. The flasks are placed on a rotary shaker having a radius of motion of ½ inch at 160 R. P. M., and grown for 2–3 days. The amount of inoculum used is not critical. 0.5% of shake culture by volume has been successfully used, but 5% is commonly used.

EXAMPLE 2.—STIRRED FERMENTATIONS

The fermentor commonly used was a fully baffled 5 liter tank, equipped with a 4 bladed paddle type agitator and a single orifice sparger located directly under the agitator. Any similar fermentor in which aeration levels of approximately 40–60 millimoles of oxygen per liter per hour can be obtained is suitable.

An aqueous medium containing the following was used:

| | Percent |
|---|---|
| Glucose | 20–30 |
| Corn steep liquor | 0.8–1.2 |
| Urea | 0.35–0.52 |

The glucose and corn steep liquor were sterilized together in the fermentor. The urea was sterilized separately and added to the rest of the medium afterwards. Suitable precautions to prevent loss of urea during sterilization were necessary.

EXAMPLE 3.—EFFECT OF REACTION VESSEL

The fermentation using the yeast in an aqueous medium containing 20% glucose was carried out in 500 ml. shake flasks and in the 5 liter fermentor. Various amounts of media were placed in the 500 ml. shake flasks, and in the 5 liter fermentor. The amounts of various products were determined at the end of the fermentation period. The results are given in Table 1.

*Table 1*

| Volume of Media | Glycerol and arabitol (as glycerol) mg./ml. | Glycerol mg./ml. | D-arabitol mg./ml. | Ethanol mg./ml. | Time to completion, days |
|---|---|---|---|---|---|
| 100 ml | 73.5 | 31.3 | 81.5 | 23.9 | 6 |
| 50 ml | 108.6 | 60.2 | 86.2 | 1.5 | 6 |
| 25 ml | 135.0 | 83.2 | 87.5 | nil | 8 |
| Air Flow Rate in ml./min./fermentor: | | | | | |
| 30 | 30.2 | 9.6 | 40.3 | 60.0 | 5 |
| 300 | 83.6 | 61.8 | 46.0 | nil | 6 |

From these results it is evident that the optimum yields of glycerol and D-arabitol occur when 25 mls. of medium are fermented in a 500 ml. Erlenmeyer flask.

Examples of the effects of aeration, glucose concentration, added nitrogen, added phosphate and temperature are now given.

EXAMPLE 4.—AERATION

The method of Example 2 was repeated using an aqueous medium containing 20% glucose plus 0.8% corn steep liquor plus 0.35% urea. The results of the effects of aeration are summarized in Table 2.

*Table 2*

| Rate of aeration | Glycerol, mg./ml. | D-arabitol, mg./ml. | Time of fermentation, days |
|---|---|---|---|
| 12 millimoles $O_2$/liter/hr | 60 | 50 | 5 |
| 38 millimoles $O_2$/liter/hr | 89 | 46 | 6 |

These results indicate that the optimum rate of aeration required in the small fermentors was about 40–60 millimoles of oxygen per liter per hour. Below this figure the yield of glycerol begins to decrease, above it the rate of fermentation decreases.

EXAMPLE 5.—GLUCOSE CONCENTRATION

The fermentation using a medium containing corn steep liquor, urea and glucose as shown in Example 4, and aerated at 60 millimoles $O_2$/liter/hour gave the results shown in Table 3.

*Table 3*

| Corn steep liquor, percent | Urea, percent | Glucose concentration, percent | Glycerol, mg./ml. | D-arabitol, mg./ml. | Time of fermentation, days |
|---|---|---|---|---|---|
| 0.86 | 0.41 | 23 | 72 | 55 | 10 |
| 1.09 | 0.51 | 29 | 103 | 51 | 10 |

EXAMPLE 6.—EFFECT OF ADDED NITROGEN

A series of fermentations was performed in which various nitrogenous materials were added. The first series used an aqueous medium containing 20% glucose and 0.114% urea, with varying amount of yeast extract or corn steep liquor and urea being added. The second series used corn steep liquor. The third series used an aqueous medium containing 20% dextrose and 1% yeast extract with different nitrogenous materials added. The results of the three series of experiments are given in Tables 4, 5 and 6.

*Table 4.—Series 1*

| Yeast Extract (percent) | Corn steep liquor (percent) | Glycerol and D-arabitol (as glycerol) mg./ml. | Time to completion (days) |
|---|---|---|---|
| | 1.25 | 54.6 | 9 |
| | 1.30 | 53.2 | 8 |
| | 1.40 | 48.4 | 7 |
| 0.5 | | 46.3 | 24 |
| 0.75 | | 56.2 | 10 |
| 1.0 | | 80.0 | 7 |

*Table 5.—Series 2*

| Corn steep liquor (percent) | Urea (percent) | Glycerol and D-arabitol (as glycerol) mg./ml. | Time to completion (days) |
|---|---|---|---|
| 1.0 | 0.20 | 78.1 | 7 |
| 1.0 | 0.26 | 82.2 | 6 |
| 0.80 | 0.20 | 83.5 | 8 |
| 0.80 | 0.26 | 89.0 | 8 |
| 0.80 | 0.32 | 89.2 | 6 |

*Table 6.—Series 3*

| Supplementary Nitrogen Source | Amount (percent) | Glycerol and D-arabitol (as glycerol) mg./ml. | Time to completion (days) |
|---|---|---|---|
| None | | 73.0 | 8. |
| Urea | 0.114 | 70.1 | 5. |
| $(NH_4)_2SO_4$ | 0.25 (as $NH_4^+$) | 47.0 | 6. |
| $NH_4H_2PO_4$ | 0.25 (as $NH_4^+$) | 32.8 | 54.0 mg./ml. dextrose remaining after 8 days. |
| Ammonium Tartrate | 0.25 (as $NH_4^+$) | 64.3 | 5 days. |

From these results it can be seen that both corn steep liquor and yeast extract may be used as sources of nitrogen in the fermentation according to the present invention. It can be seen that the yields obtainable are only slightly less when corn steep liquor was used. It is also evident that urea may be used as an effective source of nitrogen and may be used in concentrations of up to 0.35%. It can be seen that ammonium sulfate and ammonium tartrate may be substituted for urea, but the yields are then somewhat lower. The addition of monobasic ammonium phosphate seems to be deleterious to the fermentations.

EXAMPLE 7.—EFFECT OF PHOSPHATE CONCENTRATION

A series of fermentation was carried out using 50 mls. of an aqueous medium containing 20% glucose, 1% yeast extract and 0.228% urea in a 500 ml. Erlenmeyer flask, with varying amounts of sodium dihydrogen phosphate being added. The results are summarized in Table 6.

Table 6

| $NaH_2PO_4$ concentration (molar) | Glycerol and D-arabitol (as glycerol) mg./ml. | Ethanol (mg./ml.) | Time to completion (days) |
|---|---|---|---|
| Nil | 8.40 | 23.0 | 4 |
| 1/1920 | 6.40 | 30.0 | 4 |
| 1/960 | 52.1 | 32.4 | 3 |
| 1/480 | 51.0 | 32.3 | 4 |

These results show that phosphates have a marked effect upon the fermentation, small quantities of phosphate reducing the glycerol yield considerably and increasing the ethanol yield. However, it was found that the yield of D-arabitol was not affected to any great degree.

EXAMPLE 8.—EFFECT OF TEMPERATURE

A fermentation using an aqueous medium containing 20% glucose, 0.8% corn steep liquor and 0.32% urea, and aerated at the rate of 58 millimoles $O_2$/liter/hour gave the following results, which are summarized in Table 7.

Table 7

| Temperature | Glycerol, mg./ml. | D-arabitol, mg./ml. | Time of fermentation, days |
|---|---|---|---|
| 30° C | 39 | 61 | 10 |
| 37° C | 64 | 69 | 5 |

The minimum temperature for a satisfactory rate of fermentation as indicated in Table 7 was 30° C. Increasing the temperature to 37° C. doubled the rate of fermentation and increased the yields of glycerol and D-arabitol.

EXAMPLE 9.—EFFECT OF SUGAR CONCENTRATION

A fermentation was carried out using 3 liters of an aqueous medium containing 40% glucose, 1.50% corn steep liquor and 0.70% urea in a 5 liter stirred fermentor at an agitator speed of 385 R. P. M. and a rate of air flow of 500 ml./min./fermentor. The temperature was 30° C.

The final concentration of glycerol plus D-arabitol (as glycerol) after 14 days was 154 mg./ml. The residual glucose concentration was 40 mg./ml.

It is possible to utilize the residual glucose by allowing the fermentation to continue for several more days.

EXAMPLE 10.—ERYTHRITOL FORMATION

A fermentation was carried out using 3 liters of an aqueous medium containing 20% glucose, 1.3% yeast extract and 0.3% urea in a 5 liter stirred fermentor at an agitator speed of 385 R. P. M. and a rate of air flow of 800 ml./min./fermentor. The temperature was 30° C.

After 10 days had elapsed, the final concentration of erythritol was 4.8%.

The analytical methods for determining total polyhydric alcohols, D-arabitol, glycerol and ethanol are given below:

ANALYTICAL METHODS (a) Total polyhydric alcohols were determined by oxidation with periodic acid, followed by colorimetric determination of the formaldehyde thus formed with sodium 1,8-dihydroxynaphthalene-3,6-disulfonate reagent. This method is a general one for all acyclic polyhydric alcohols having hydroxyl groups on both carbon-1 and carbon-2, so when a mixture of glycerol and D-arabitol was present, the total yield was calculated as glycerol which gives a figure somewhat less than the total weight of the two compounds present. This method was used because it was rapid enough to use for routine control determinations.

(b) Glycerol was determined by analyzing the fermentation broth by partition chromatography on a wet celite column, and analyzing the fraction of the eluate containing the glycerol by the method mentioned in (a).

(c) D-arabitol was determined by eluting the column used in (b) with water and analyzing for D-arabitol by the method mentioned in (a).

(d) Ethanol was determined by oxidation with acid potassium dichromate in a Conway microdiffusion cell, and determining the excess dichromate by adding potassium iodide and titrating with sodium thiosulphate.

In the present specification, including the claims, the percentages are given by weight.

What we claim is:

1. A process for the production of a polyhydric alcohol selected from the group consisting of of D-arabitol, erythritol and glycerol which comprises fermenting a sugar with an osmophilic yeast selected from the group consisting of *Saccharamyces rouxii* and *Saccharomyces mellis*.

2. A process as claimed in claim 1 performed in the presence of a nitrogenous agent.

3. A process as claimed in claim 2 in which the fermentation is conducted with aeration.

4. A process for the production of a polyhydric alcohol selected from the group consisting of D-arabitol, erythritol and glycerol which comprises fermenting a hexose with an osmophilic yeast selected from the group consisting of *Saccharomyces rouxii* and *Saccharomyces mellis*.

5. A process for the production of a polyhydric alcohol selected from the group consisting of D-arabitol, erythritol and glycerol which comprises fermenting a sugar with an osmophilic yeast selected from the group consisting of *Saccharomyces rouxii* and *Saccharomyces mellis*, in the presence of a nitrogenous agent selected from the group consisting of corn steep liquor and yeast extract.

6. A process for the production of a polyhydric alcohol selected from the group consisting of D-arabitol, erythritol and glycerol which comprises fermenting, with aeration, a sugar with an osmophilic yeast selected from the group consisting of *Saccharomyces rouxii* and *Saccharomyces mellis*, in the presence of a nitrogenous agent selected from the group consisting of corn steep liquor and yeast extract.

7. A process for the production of a polyhydric alcohol selected from the group consisting of D-arabitol, erythritol and glycerol which comprises fermenting glucose with an osmophilic yeast selected from the group consisting of *Saccharomyces rouxii* and *Saccharomyces mellis* in the presence of a nitrogenous agent selected from the group consisting of corn steep liquor and yeast extract.

8. A process for the production of a polyhydric alcohol selected from the group consisting of D-arabitol, erythritol and glycerol which comprises fermenting fructose with an osmophilic yeast selected from the group consisting of *Saccharomyces rouxii* and *Saccharomyces mellis*, in the presence of a nitrogenous agent selected from the group consisting of corn steep liquor and yeast extract.

9. A process for the production of a polyhydric alcohol selected from the group consisting of D-arabitol, erythritol and glycerol which comprises fermenting mannose with an osmophilic yeast selected from the group consisting of *Saccharomyces rouxii* and *Saccharomyces mellis*, in the presence of a nitrogenous agent selected from the group consisting of corn steep liquor and yeast extract.

10. A process for the production of a polyhydric alcohol selected from the group consisting of D-arabitol, erythritol and glycerol which comprises fermenting a sugar in a medium containing an osmophilic yeast of the species *Saccharomyces rouxii* a nitrogenous agent selected from the group consisting of corn steep liquor and yeast extract and a further nitrogenous agent selected from the group consisting of urea, ammonium sulfate and ammonium tartrate.

11. A process for the production of a polyhydric alcohol selected from the group consisting of D-arabitol, erythritol and glycerol which comprises fermenting a sugar in a medium containing an osmophilic yeast of the species *Saccharomyces mellis* and a nitrogenous agent selected from the group consisting of corn steep liquor and yeast extract, and a further nitrogenous agent selected from the group consisting of urea, ammonium sulfate and ammonium tartrate.

12. A process for the production of a polyhydric alcohol selected from the group consisting of D-arabitol, erythritol and glycerol which comprises fermenting 20–30% glucose in a medium containing 0.8–1.0% of a nitrogenous agent selected from the group consisting of yeast extract and corn steep liquor, 0.3–0.35% urea and osmophilic yeast of the species *Saccharomyces rouxii*.

13. A process for the production of a polyhydric alcohol selected from the group consisting of D-arabitol, erythritol and glycerol which comprises fermenting a suger in a medium containing an osmophilic yeast of the species *Saccharomyces mellis* a nitrogenous agent selected from the group consisting of corn steep liquor an yeast extract and a further nitrogenous agent selected from the group consisting of urea, ammonium sulfate and ammonium tartrate.

14. A process for the production of a polyhydric alcohol selected from the group consisting of D-arabitol, erythritol and glycerol, which comprises fermenting 20–30% glucose in a medium containing 0.8–1.0% of a nitrogenous agent selected from the group consisting of yeast extract and corn steep liquor, 0.3–0.35% urea and an osmophilic yeast of the species *Saccharomyces rouxii*, said process including aeration of the medium.

15. A process for the production of a polyhydric alcohol selected from the group consisting of D-arabitol, erythritol and glycerol which comprises fermenting a suger in a medium containing an osmophilic yeast of the species *Saccharomyces mellis* a nitrogenous agent selected from the group consisting of corn steep liquor and yeast extract and a further nitrogenous agent selected from the group consisting of urea, ammonium sulfate and ammonium tartrate, said process including aeration of the medium.

16. A process as claimed in claim 6 in which the rate of said aeration is 40–60 millimoles of oxygen per liter of medium per hour.

17. A process for the production of a mixture including at least two polyhydric alcohols selected from the group consisting of D-arabitol, erythritol and glycerol which comprises fermenting a sugar with an osmophilic yeast selected from the group consisting of *Saccharomyces rouxii* and *Saccharomyces mellis*.

18. A process for the production of a mixture including at least two polyhydric alcohols selected from the group consisting of D-arabitol, erythritol and glycerol which comprises fermenting, with aeration, a sugar with an osmophilic yeast selected from the group consisting of *Saccharomyces rouxii* and *Saccharomyces mellis*, in the presence of a nitrogenous agent selected from the group consisting of corn steep liquor and yeast extract.

References Cited in the file of this patent

FOREIGN PATENTS 7,813    Great Britain _____ of 1908